(12) United States Patent
Katsuyama et al.

(10) Patent No.: US 7,002,605 B1
(45) Date of Patent: Feb. 21, 2006

(54) IMAGE DISPLAY APPARATUS FOR FIXING LUMINANCE OF BLANK AREA AND VARYING ONLY LUMINANCE OF IMAGE

(75) Inventors: Tomoyasu Katsuyama, Kanagawa-ken (JP); Naoki Hagiwara, Kanagawa-ken (JP); Yoshihiro Date, Kanagawa-ken (JP); Fumiaki Inage, Miyagi-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 90 days.

(21) Appl. No.: 09/609,502

(22) Filed: Jul. 3, 2000

(51) Int. Cl.
  *Q09G 5/10* (2006.01)
(52) U.S. Cl. .................. 345/690; 345/207; 345/20; 345/63
(58) Field of Classification Search .............. 345/89, 345/88, 87, 94, 95, 100, 20, 63, 77, 673, 345/687, 690, 698, 699, 712, 589, 596, 207
See application file for complete search history.

(56) References Cited

U.S. PATENT DOCUMENTS

| | | | |
|---|---|---|---|
| 4,945,351 A * | 7/1990 | Naiman | 345/589 |
| 5,151,007 A * | 9/1992 | Maruo | 414/744.2 |
| 5,504,538 A | 4/1996 | Tsujihara et al. | |
| 5,539,425 A * | 7/1996 | Kamaguchi et al. | 345/77 |
| 6,054,971 A * | 4/2000 | Okada et al. | 345/89 |
| 6,151,000 A * | 11/2000 | Ohtaka et al. | 345/63 |
| 6,249,313 B1 * | 6/2001 | Nishi | 348/333.01 |
| 6,249,362 B1 * | 6/2001 | Sato et al. | 358/527 |

* cited by examiner

*Primary Examiner*—Xiao Wu
*Assistant Examiner*—Jean Lesperance
(74) *Attorney, Agent, or Firm*—Brinks Hofer Gilson & Lione

(57) ABSTRACT

An image display apparatus fixes the luminance of a blank area and varies only the luminance of an image. The image display apparatus includes an A/D conversion device to convert an input analog image signal into digital image data, a black level setting device for setting the black level of the digital image data by adjusting a lower-limit reference voltage of the A/D conversion device, a blank data generation device to generate blank data to display a blank area around an image display area on the screen, an image data combining device to combine the blank data generated by this blank data generation device and the digital image data output from the A/D conversion device, and a display device to display the output of this image data combining device on the screen.

15 Claims, 5 Drawing Sheets

IMAGE DISPLAY APPARATUS FOR FIXING LUMINANCE OF BLANK AREA AND VARYING ONLY LUMINANCE OF IMAGE

This application claims the benefit of priority to Japanese Patent Application 11-190996, filed on Jul. 5, 1999.

BACKGROUND OF THE INVENTION

1. Field of the Invention

The present invention relates to an image display apparatus.

2. Description of the Related Art

Generally, image display apparatuses include a function for adjusting the black level, that is, the level at which the luminance is lowest in an image to be displayed on a monitor of these apparatuses. Conventionally, in order to realize this function, a method is used to vary a γ correction voltage in a γ correction circuit. This γ correction corrects the characteristics of gradation (degree of luminance variation) of an image to linear characteristics, and use of this correction also makes it possible to adjust the black level at which the luminance is lowest.

Meanwhile, there is a case in which a blank area is displayed on an image display apparatus such as that described above so that a blanking mark indicating a photographic range of a video camera, etc., is displayed superimposed on an image. This blank area is often displayed at the black level at which the luminance is lowest. It is preferable that the black level of this blank area always be at a predetermined level without being influenced by the luminance of an image to be displayed.

However, if attempts to vary the black level by a method which uses the above-described γ correction circuit are made, since this γ correction circuit is provided immediately before a driver which drives a display mechanism, such as an LCD, and a combined image after the blank area and the image are combined together is corrected, there is a problem in that the luminances of both of the blank area and the image vary at the same time.

SUMMARY OF THE INVENTION

The present invention has been achieved to solve the above-described problem. An object of the present invention is to provide an image display apparatus capable of fixing the luminance of a blank area and varying only the luminance of an image.

To achieve the above-mentioned object, according to the present invention, there is provided an image display apparatus comprising an A/D converter to convert an input analog image signal into digital image data; a black level setting mechanism to set the black level of the digital image data by adjusting a lower-limit reference voltage of the A/D converter; a blank data generator to generate blank data to display a blank area around an image display area on a screen; an image data combiner to combine blank data generated by this blank data generator and digital image data output from the A/D converter; and a display to display an output of this image data combiner on the screen.

According to the image display apparatus of the present invention, the black level of an image display area can be adjusted by a black level setting mechanism independently of the data of the blank area.

Preferably, the black level setting mechanism is a variable resistor. The black level setting mechanism preferably includes an illuminance sensor to detect the illuminance of the surroundings of a video camera, which outputs an analog image signal so that the black level is automatically set in correspondence with the illuminance of the surroundings of the camera.

The automatic setting of the black level is complete since the illuminance sensor outputs a lower-limit reference voltage corresponding to the detected illuminance.

The above and further objects, aspects and novel features of the invention will become more fully apparent from the following detailed description when read in conjunction with the accompanying drawings.

DESCRIPTION OF THE PREFERRED EMBODIMENTS

Figure 1:
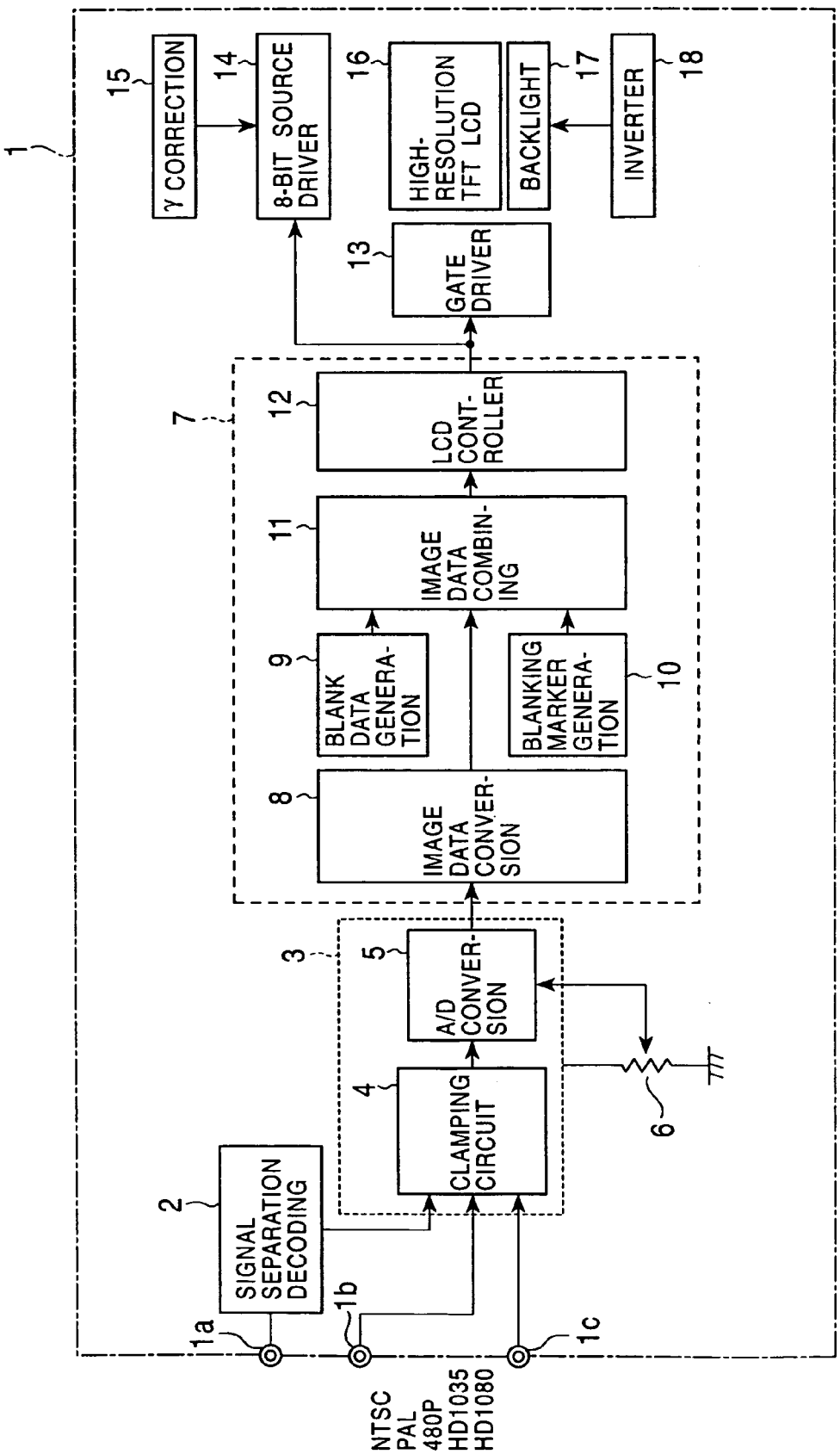
FIG. 1 is a schematic diagram of an image display apparatus according to a first embodiment of the present invention.

The construction of an image display apparatus 1, which is a programmable logic device (PLD), according to a first embodiment of the present invention is described below with reference to FIG. 1. The image display apparatus 1 is provided with input terminals 1a, 1b, and 1c for inputting a video signal from the outside. Also, the image display apparatus 1 has contained therein a Y/C separation RGB decoding circuit 2, an A/D converter 3, a variable resistor 6, an image signal processing circuit 7, a gate driver 13, a source driver 14, a γ correction circuit 15, a 6-inch high-resolution TFT LCD 16 having 962×562 pixels, a backlight 17, and an inverter 18.

The input terminal 1a is connected to the input terminal of the Y/C separation RGB decoding circuit 2, and the output terminal of the Y/C separation RGB decoding circuit 2 is connected to the input terminal of the A/D converter 3. The input terminals 1b and 1c are connected directly to the input terminal of the A/D converter 3.

The variable resistor 6 has three terminals, a second terminal thereof extending from the middle of the resistor so as to allow variation of the connection point with the resistor. The first and third terminals extend from both ends of the resistor. Therefore, the resistance value between the first terminal and the second terminal, and the resistance value between the second and the third terminal are variable. The second terminal is connected to the input terminal of the A/D converter 3. The first terminal is fixed to an upper-limit reference voltage Vh, and the third terminal is connected to a ground potential.

The output terminal of the A/D converter 3 is connected to the input terminal of the image signal processing circuit 7. The output of this image signal processing circuit 7 is connected to the input terminals of the gate driver 13 and the source driver 14. The output terminal of the γ correction circuit 15 is connected to the input terminal of the source driver 14.

The output terminals of the gate driver 13 and the source driver 14 are connected to the input terminal of the LCD 16 so that each pixel of the LCD 16 is driven. The output terminal of the inverter 18 is connected to the input terminal of the backlight 17, and the inverter 18 drives the backlight 17. The backlight 17, disposed in the back of the LCD 16, emits transmission light which passes through this LCD 16 from the back of the LCD 16 so that this transmission light illuminates the LCD 16.

Referring also to FIG. 1, the internal construction of the A/D converter 3 is described below. The A/D converter 3 has contained therein a clamping circuit 4 and an A/D conversion circuit 5. The three input terminals provided in the A/D converter 3 are connected to the input terminal of the clamping circuit 4, and the output terminal of this clamping circuit 4 is connected to the input terminal of the A/D conversion circuit 5. The output terminal of the A/D conversion circuit 5 is connected to the output terminal of the A/D converter 3. The input terminal of the A/D converter 3, which is connected to the second terminal of the variable resistor 6, is connected to the input terminal of the lower-limit reference voltage of the A/D conversion circuit 5.

Referring also to FIG. 1, the internal construction of the image signal processing circuit 7 is described below. The image signal processing circuit 7 has contained therein an image data conversion circuit 8, a blank data generation circuit 9, a blanking marker generation circuit 10, an image data combining circuit 11, and an LCD controller 12.

The input terminal of the image signal processing circuit 7 is connected to the input terminal of the image data conversion circuit 8. The output terminals of the image data conversion circuit 8, the blank data generation circuit 9, and the blanking marker generation circuit 10 are connected to the input terminal of the image data combining circuit 11. The output terminal of the image data combining circuit 11 is connected to the input terminal of the LCD controller 12, and the output terminal of this LCD controller 12 is connected to the output terminal of the image signal processing circuit 7.

Figure 2:
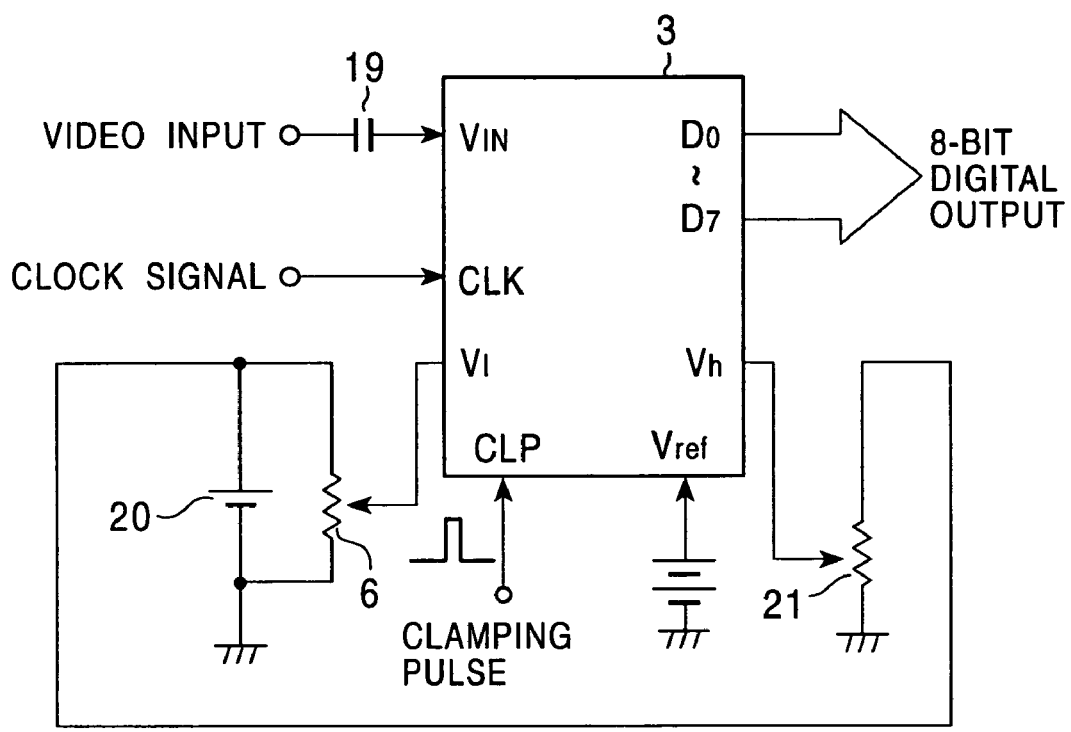
FIG. 2 is a diagram of circuits peripheral to an A/D converter.

Next, referring to FIG. 2, a detailed circuit construction of the periphery of the A/D converter 3 is described. A video signal from the input terminal of the image display apparatus 1 or from the output terminal of the Y/C separation RGB decoding circuit 2 is input to a terminal Vin of the A/D converter 3 through a capacitor 19. A clock signal is input to a terminal CLK of the A/D converter 3. A clamping pulse is input to a terminal CLP of the A/D converter 3. A clamping voltage is input to a terminal Vref of the A/D converter 3.

A lower-limit reference voltage output from the second terminal of the variable resistor 6, which is connected to a reference voltage source 20 output from the second terminal of the variable resistor 6, is input to the terminal Vl of the A/D converter 3. An upper-limit reference voltage, which is output from the reference voltage source 20 through a variable resistor 21, is input to a terminal Vh of the A/D converter 3. The output terminal on the negative side of the reference voltage source 20 is connected to a ground potential. An 8-bit digital signal is output from the output terminals D0 to D7 of the A/D converter 3. This digital signal takes a digital value such that the section between the lower-limit reference voltage and the upper-limit reference voltage is divided evenly by 256, that is, an 8-bit digital value.

Next, referring to FIG. 1, the operation of this embodiment is described. A video signal, which is an analog signal, is input from the input terminals 1a, 1b, or 1c provided in the image display apparatus 1. In a case where a video signal is input from the input terminal 1a, this video signal is input to the A/D converter 3 after passing through the Y/C separation RGB decoding circuit 2. In a case where a video signal is input from the input terminal 1b or 1c, the input video signal is input directly to the A/D converter 3.

The black level, that is, the level at which luminance is lowest, of the video signal which is input to the A/D converter 3 is clamped by the clamping circuit 4 contained in the A/D converter 3. The A/D conversion circuit 5 digitizes the video signal, whose black level is clamped. The digitized video signal is output from the A/D converter 3 and is input to the image signal processing circuit 7.

The digitized video signal, which is input to the image signal processing circuit 7, is converted into image data by the image data conversion circuit 8 contained in the image signal processing circuit 7, and is input to the image data combining circuit 11. Blank data output from the blank data generation circuit 9 contained also in the image signal processing circuit 7 is also input to the image data combining circuit 11. This blank data contains a signal that specifies a black level in a blank area on the screen.

Furthermore, a blanking marker signal output from the blanking marker generation circuit 10 is also input to the image data combining circuit 11. This blanking marker signal contains a signal that specifies a white level (level at which the luminance is highest) of a boundary line between the image display area of the screen and the blank area thereof. The image data combining circuit 11 combines the image data, the blank data, and the blanking marker signal, and outputs the combined image data to the LCD controller 12.

The LCD controller 12 converts the combined image data into an LCD driving signal and outputs the converted LCD driving signal to the gate driver 13 and the source driver 14. The LCD 16 is driven by the gate driver 13 and the source driver 14, and a combined image formed by the combined image data is displayed on the LCD 16.

The γ correction circuit 15 sends a γ correction voltage to the source driver 14 so that γ correction of the image is performed. Also, the inverter 18 drives the backlight 17 so that this backlight 17 supplies transmission illumination light from the back of the LCD 16.

Figure 3:
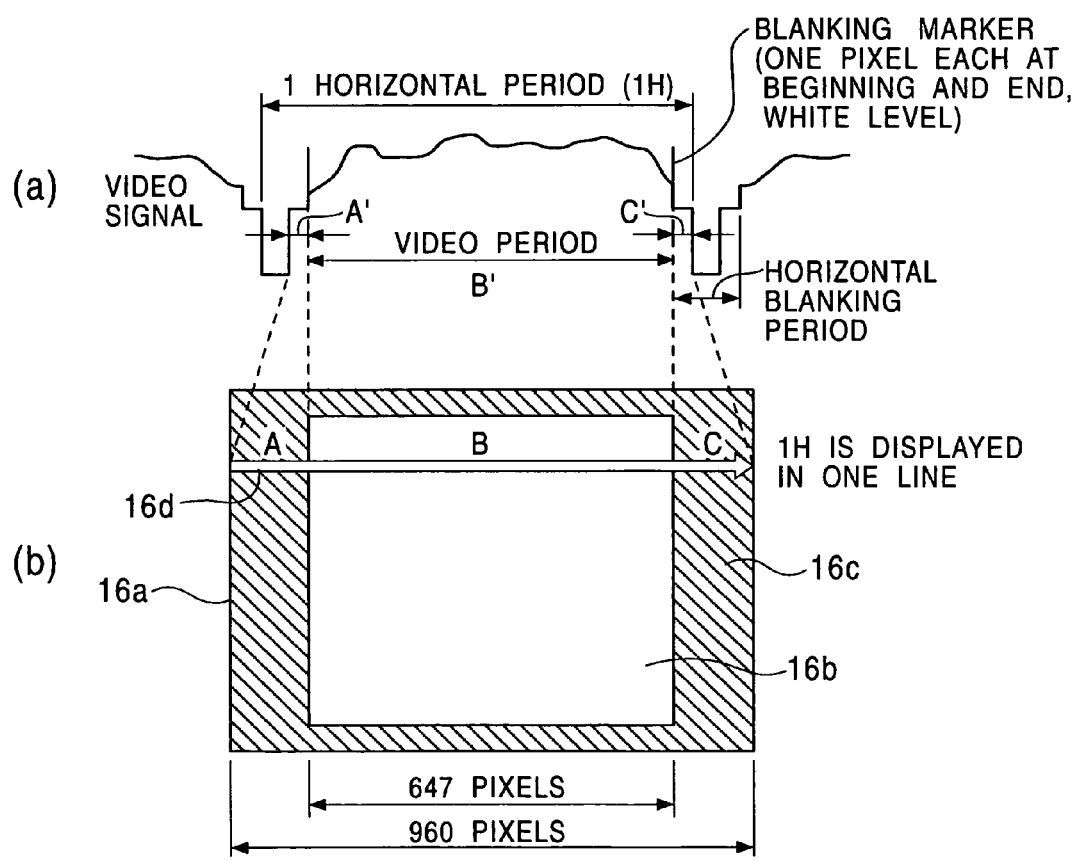
FIG. 3 is a diagram showing the relationship between an image display of an LCD and a combined image signal.

Next, referring to FIG. 3, the relationship between combined image displayed on the screen of the LCD 16 and a combined image data (video signal) is described. A screen 16a of the LCD 16, shown at (b) in FIG. 3, is divided into an image display area 16b and a blank area 16c. In the image display area 16b, an image formed by the video signal input to the image display apparatus 1, that is, an image within the photographic range of a video camera or the like, is displayed. In the blank area 16c, a black level determined in accordance with blank data generated by the blank data generation circuit 9 is displayed.

A waveform of combined image data (video signal) to display a particular line 16d in the horizontal direction on the screen 16a is shown at (a) in FIG. 3. In this embodiment, one line in the horizontal direction is composed of 960 pixels, and among them, the number of pixels of the image display area 16b is 647. The blank area 16c is equally provided on the right and left of the image display area 16b. The line 16d is scanned from left to right. The blank area 16c is also equally provided in the upper and lower portions of the image display area 16b.

A first interval A of the line 16d is drawn by an interval A' of a video signal, an interval B is drawn by an interval B', and an interval C is drawn by an interval C'. The signal level of the interval A' and the interval C' is a black level determined in accordance with the blank data generated by the blank data generation circuit 9.

Also, a blanking marker signal is inserted between the interval A' and the interval B' and between the interval B' and the interval C'. These blanking marker signals correspond to one pixel between the interval A and the interval B and between the interval B and the interval C in the line 16d on the screen 16a. Therefore, as a result of scanning by the line 16d being repeated, a white line is displayed vertically between the interval A and the interval B and between the interval B and the interval C on the screen 16a.

The blank areas displayed in the upper and lower portions of the screen 16a are displayed by the line at this position by drawing the black level of the blank area over one horizontal period.

The black level of the blank area 16c differs from the black level of the image display area 16b, each of which is determined by a mutually different signal. That is, the black level of the blank area 16c is determined by the blank data generated by the blank data generation circuit 9, and the black level of the image display area 16b is determined by the lower-limit reference voltage input to the terminal V1 of the A/D converter 3. The variable resistor 6 adjusts the lower-limit reference voltage.

Since the blank data generated by the blank data generation circuit 9 does not pass through the A/D converter 3, even if the lower-limit reference voltage is changed, this blank data is not affected by this change. Therefore, even if the lower-limit reference voltage is adjusted by the variable resistor 6 and the black level of the image display area 16b is adjusted, the black level of the blank area 16c does not change.

Figure 4:
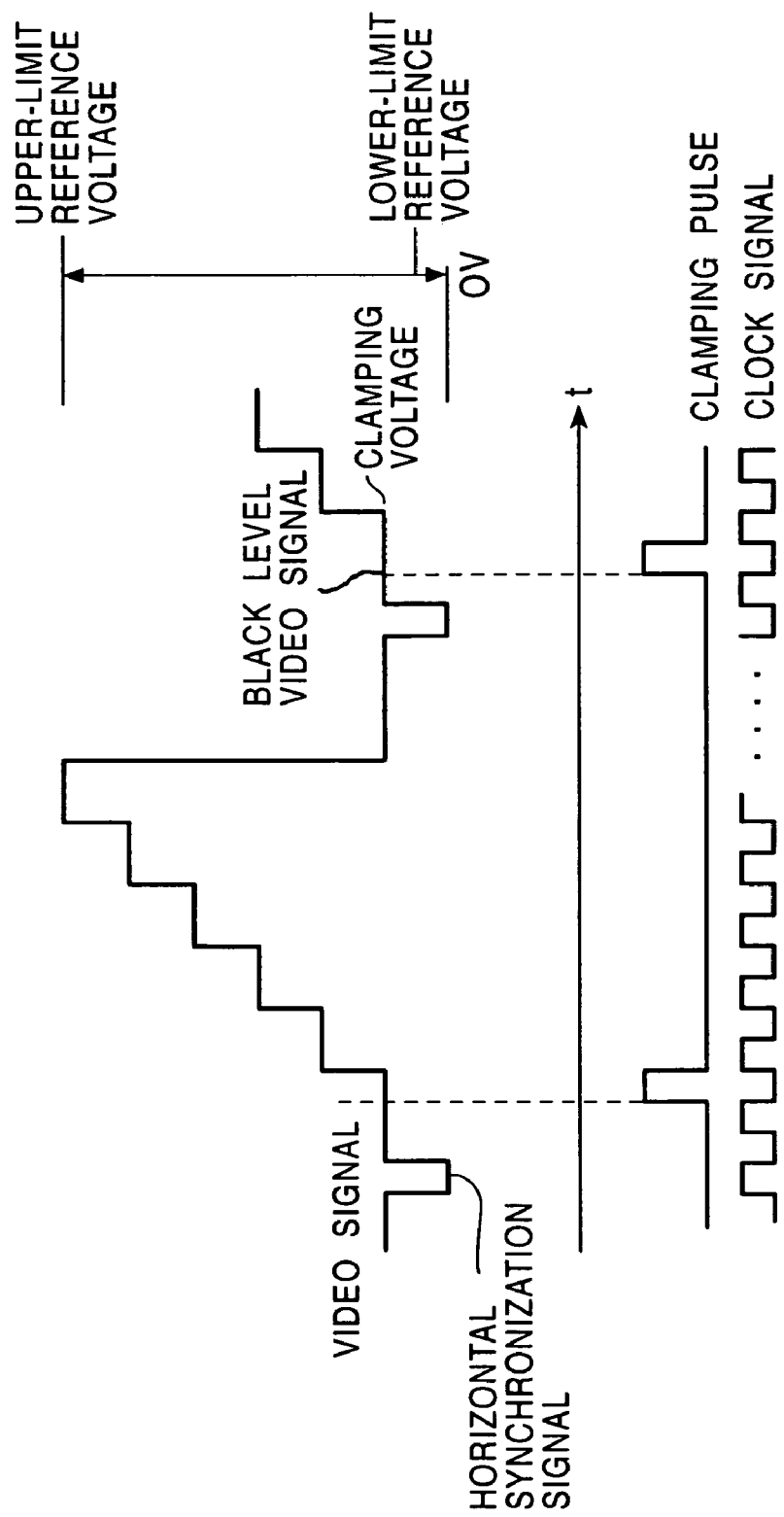
FIG. 4 is a timing chart of a video signal.

Next, referring to FIG. 4, a sampling operation of a video signal is described. The black level (the level at which the luminance is lowest) of the input video signal is determined by the clamping voltage, which has been input to the terminal Vref when a clamping pulse is input to the CLP terminal of the A/D converter 3. The digital signal output from the A/D converter 3 becomes a value determined by the relationship between the clamping voltage and the lower-limit reference voltage input to the terminal Vl of the A/D converter 3. The sampling of the video signal is performed in synchronization with the clock signal input to the terminal CLK of the A/D converter 3.

Figure 5:
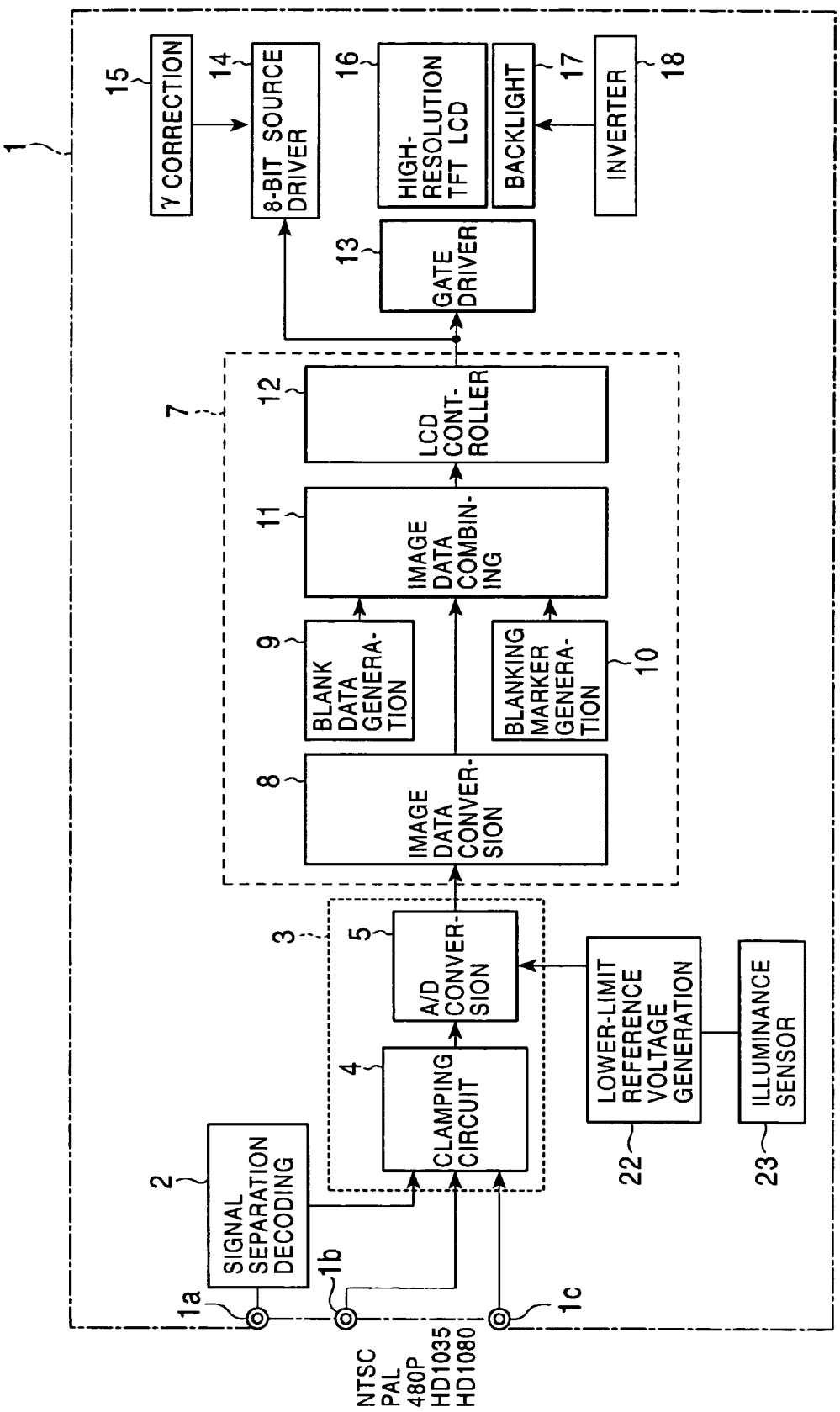
FIG. 5 is a schematic diagram of an image display apparatus according to a second embodiment of the present invention.

Next, referring to FIG. 5, a second embodiment of the present invention is described. The same components in FIG. 5 as those of the first embodiment are given the same reference numerals, and accordingly, descriptions thereof are omitted. In the second embodiment, instead of the variable resistor 6 in the first embodiment, an illuminance sensor 23 and a lower-limit reference voltage generation circuit 22 are provided. The illuminance sensor 23 is disposed, for example, near a video camera or the like which outputs a video signal to be input to the image display apparatus 1, and measures the illuminance near this video camera or the like. The output of the illuminance sensor 23 is input to the lower-limit reference voltage generation circuit 22, whereby a lower-limit reference voltage corresponding to this input is output from the lower-limit reference voltage generation circuit 22, and this output is input to the A/D conversion circuit 5 inside the A/D converter 3.

With such a construction, the lower-limit reference voltage automatically changes in accordance with the illuminance around the video camera or the like. Therefore, if the surroundings of the video camera or the like are bright, the lower-limit reference voltage also increases, and the black level of the signal also increases in accordance with this voltage. If, in contrast, the surroundings of the video camera are dark, the lower-limit reference voltage decreases, and the black level of the signal also decreases in accordance with this voltage. However, since the black level of the blank area is determined only by the blank data output from the blank data generation circuit 9, and this blank data does not pass through the A/D conversion circuit 5 to which the lower-limit reference voltage is applied, even if the illuminance of the surroundings of the video camera or the like changes, this change is detected by the illuminance sensor 23, and the lower-limit reference voltage is changed as a result of this detection, the black level of the blank area does not change.

According to the present invention, since the black levels of an image display area and a blank area can be set individually, even if the luminance of an image to be displayed is changed by adjusting the black level of the image display area, the black level of the blank area does not change.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image display apparatus comprising:
    a screen capable of displaying an image area and a blank area;
    an A/D converter to convert an input analog image signal into digital image data;
    a black level setting mechanism to set a first black level of the digital image data by adjusting a lower-limit reference voltage of the A/D converter;
    a blank data generator to generate blank data to form the blank area around the image display area, a second black level of the blank area being independent of the first black level of the digital image area;
    an image data combiner to combine the blank data and the digital image data; and
    an output of the image data combiner being displayed on said screen.

2. An image display apparatus according to claim 1, said black level setting mechanism comprising a variable resistor.

3. An image display apparatus according to claim 1, said black level setting mechanism comprising an illuminance sensor to detect the illuminance around a video camera that outputs said analog image signal.

4. An image display apparatus according to claim 3, wherein said black level setting mechanism outputs a lower-limit reference voltage corresponding to illuminance detected by said illuminance sensor.

5. The image display apparatus according to claim 1, further comprising a blanking marker signal corresponding to a single pixel between the blank area and the image display area such that a white line is vertically displayed on the screen which separates the blank area and the image display area.

6. A method of displaying an image comprising:
    converting an input analog image signal into digital image data;
    adjusting a lower-limit reference voltage of the digital image data to thereby adjust a first black level of the digital image data;

generating blank data for display in a blank area around an image display area in which a second black level of the blank data is independent of the first black level of the digital image data; combining the blank data and the digital image data; and displaying the digital image data in the image display area and the blank data in the blank area of a display screen.

7. The method of displaying an image according to claim 6, the adjusting the first black level comprising adjusting a variable resistor.

8. The method of displaying an image according to claim 6, the adjusting the first black level comprising detecting an illuminance around a video camera that outputs the analog image signal.

9. The method of displaying an image according to claim 8, further comprising outputting a lower-limit reference voltage corresponding to the detected illuminance.

10. The method according to claim 6, further comprising separating the blank area and the image display area on the screen by a white line of a single pixel corresponding to a blanking marker signal.

11. A method of displaying an image comprising:

converting an input analog image signal into digital image data;

adjusting a lower-limit reference voltage of the digital image data to thereby set a first black level of the digital image data;

generating blank data for display in a blank area around an image display area in which a second black level of the blank data is independent of the first black level of the image display data;

combining the blank data and the digital image data; and displaying the combination of the blank data and the digital image data on a screen.

12. The method according to claim 11, the setting of the first black level comprising adjusting a variable resistor.

13. The method according to claim 11, the setting of the first black level comprising detecting an illuminance around a video camera that outputs the analog image signal.

14. The method according to claim 13, further comprising outputting a lower-limit reference voltage corresponding to the detected illuminance.

15. The method according to claim 11, further comprising further comprising separating the blank area and the image display area on the screen by a white line of a single pixel corresponding to a blanking marker signal.

* * * * *